May 26, 1931. B. BROIDO Re. 18,082

RADIANT SUPERHEATER

Original Filed March 15, 1923

Benjamin Broido, deceased
by
The Superheater Company, assignee
INVENTOR.
BY O. V. Kiele
ATTORNEY Reissued May 26, 1931 Re. 18,082

UNITED STATES PATENT OFFICE

BENJAMIN BROIDO, DECEASED, LATE OF NEW YORK, N. Y., BY THE SUPERHEATER COMPANY, OF NEW YORK, N. Y., ASSIGNEE

RADIANT SUPERHEATER

Original No. 1,590,180, dated June 29, 1926, Serial No. 625,418, filed March 15, 1923. Application for reissue filed March 26, 1931. Serial No. 525,628.

This invention relates to superheaters of the type which has become known as the radiant type of superheaters. These superheaters are exposed to the direct radiant heat of the fuel bed and burning gases in the furnace and by far the biggest part of the heat given up to the superheating surface reaches it by direct radiation and only a comparatively small part is absorbed from the hot gases by convection. This type of superheater differs materially in a number of respect from superheaters in which the main portion of the heat is delivered up to the superheater through convection and involves entirely new and difficult problems. Among them is the important one of protecting the superheater against a too intense heat of radiation.

The object of the present invention is to provide a novel and efficient way of protecting the superheater of the radiant type against heat which may prove too intense and which may endanger the life of the superheater elements.

Figure 2:
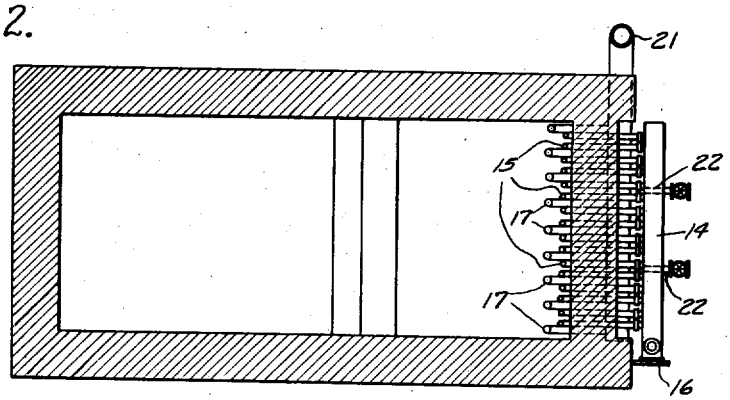
Figure 1:
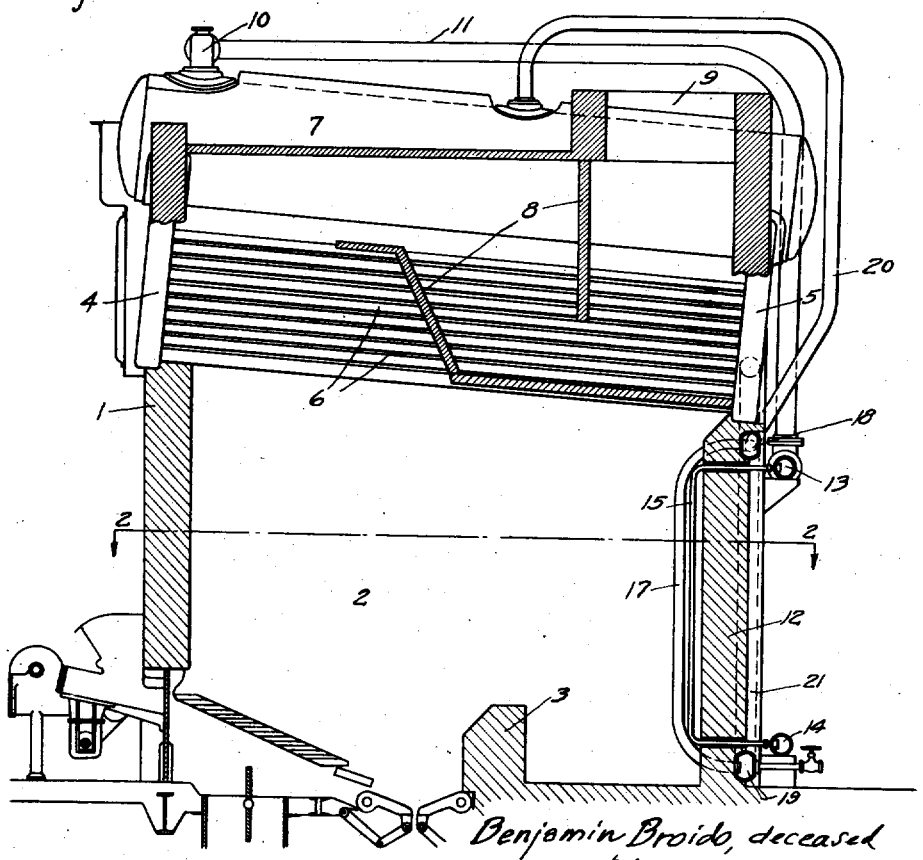

The invention is illustrated in the accompanying sheet of drawings where Fig. 1 is a longitudinal vertical section through a water tube boiler in the fire box of which there is found a superheater protected by my novel device; Fig. 2 being a sectional view on line 2—2 of Fig. 1.

The boiler in connection with which I illustrate my invention is of a usual type and is used for illustrative purposes only. It will be clear from what follows that my invention may be used in connection with boilers of a great many different types. The boiler illustrated comprises a setting 1 within which is located the furnace 2 at the rear of which there is a bridge-wall 3, the boiler proper being located above the furnace. Front and rear water legs 4 and 5 respectively are connected by the water tubes 6 and communicated at their upper ends with steam-and-water drum 7. Baffling 8 directs the gases from furnace 2 over the water tubes 6 on their way to stack connection 9. Steam is taken off from the boiler at 10 and carried through the pipe 11 either directly or through the superheater to the point of consumption.

As far as described, this boiler is of an ordinary construction. The superheater to which I wish to apply my invention is associated with the rear wall 12 of the setting although, as will be clear as the description proceeds, it might be located in one of the other walls or at some distance from the walls. It comprises the two headers 13 and 14 which are connected by a series of pipes or superheater elements 15. The headers 13 and 14 lie outside of the boiler setting and the pipes 15 each have appropriately shaped ends to connect with these headers, the main portion of the pipes 15 lying within the setting and in close proximity to the wall. Steam is carried by pipe 11 to the header 13 and is taken off from the header 14 at the point 16. The precise shape or construction of the pipes or elements 15 is immaterial as far as my invention is concerned. For purposes of illustration I show them as consisting substantially of straight bare lengths but they might be covered with protecting covering or they might equally well have some different shape. They might likewise, within the scope of the present invention, be parallel to the wall but at some angle to the vertical.

It will be noted that the superheater elements 15 are not struck directly by any of the hot products of combustion from the furnace as these pass through the boiler to the stack but on the contrary derive practically all of their heat from the fuel bed and from the hot gases by direct radiation only. The condition to which they are subjected is severe and it has been found that even when supplied with a protective covering they are apt to deteriorate vary rapidly. To interpose a screen or wall of any kind which would completely protect them against the radiant heat would defeat the very purpose of locating the superheater at this point. Nevertheless, some protection has been found essential. I am aware that it has been proposed to protect them by means of vertical tiers of bricks located between the elements and protruding somewhat beyond them toward the furnace. These bricks are supposed to mitigate somewhat the intense radiant heat but as they themselves become incandescent they impart a great deal of heat to the superheater elements.

I purpose to provide a series of water tubes 17 for this required protection. These water tubes 17 are generally shaped like the superheater elements 15, having a straight length and two bent ends, the latter communicating with the headers 18 and 19. The header 18 communicates by means of pipe 20 with the steam drum 7, while the header 19 is connected to the water leg 5 by the pipe 21. The lower header 19 is supplied with valved pipes 22—22, so that accumulations of sediment can be blown off from time to time. The lengths of the water tubes 17 are alined in a plane somewhat closer to the furnace than the superheater elements 15. It will be noted, however, that they do not lie directly in front of the superheater elements but are arranged directly in front of the alternate spaces between the superheater elements. In this manner they do not shut off to any appreciable extent the radiation from the furnace. The protection they afford, however, is sufficient to insure prolonged life to the superheater elements. As above pointed out, bricks in a similar situation radiate a large amount of heat to the superheater elements, and the result is that their protection is considerably offset. While, of course, the water tubes 17 also radiate heat they are kept at comparatively low temperature by the water circulating through them and, therefore, will absorb much more of the heat radiated by the superheater elements than they in turn give out to the latter by their own radiation. The pipes 17 are filled with boiler water and are in effect a portion of the boiler system, and a certain amount of steam will be generated in them. This will circulate upward through pipe 20 and reach the steam and water drum 7,—new water being supplied to the lower drum by pipe 21.

While I show only one row of water tubes communicating with the boiler, and connected in a particular way to it by way of headers, I do not wish to be limited in these respects, as obviously other ways may be used. The only essential is that the tubes be arranged between the furnace and the superheater elements without cutting off the radiation of heat to the superheater elements.

It will be understood that where the superheater tubes are not vertical, the protective water tubes are arranged parallel to them, nearer to the furnace, and in line with the spaces between the superheater tubes, so that the latter are exposed to the radiation just as in the case of the vertical arrangement used by way of illustration.

It will be noted that I rely for the protection of the superheater elements principally, or almost entirely, on the difference in the rate at which the superheater elements and the water cooled tubes 17 radiate heat. I do not rely on these tubes for cooling gases coming into contact with them before reaching the superheater tubes as has been practiced heretofore.

What I claim is:

1. In an apparatus of the class described, the combination of a furnace, a radiant type superheater comprising parallel vertical alined superheater tubes adjacent to a wall of said furnace and water tubes parallel to the superheater tubes and in a plane parallel to and in advance of the plane of the superheater tubes, said superheater tubes being so located relatively to the water tubes and to the furnace that they are exposed to direct radiant heat from said furnace.

2. In an apparatus of the class described, the combination of a furnace, a radiant type superheater comprising parallel vertical alined superheater tubes adjacent to a wall of said furnace, water tubes parallel to the superheater tubes and in a plane parallel to and in advance of the plane of the superheater tubes, said superheater tubes being so located relatively to the water tubes and to the furnace that they are exposed to direct radiant heat from said furnace, upper and lower headers to which the water tubes are connected, and pipes connecting them to the steam and water space of the boiler.

3. In an apparatus of the class described, the combination of a furnace, a radiant type superheater comprising parallel alined superheater tubes adjacent to a wall of said furnace and water tubes parallel to the superheater tubes and in a plane parallel to and in advance of the plane of the superheater tubes, said superheater tubes being so located relatively to the water tubes and to the furnace that they are exposed to direct radiant heat from said furnace.

4. In an apparatus of the class described, the combination of a furnace, a radiant type superheater comprising parallel vertical alined superheater tubes adjacent to a wall of said furnace and water tubes parallel to the superheater tubes and in a plane parallel to and in advance of the plane of the superheater tubes, said superheater tubes being so located relatively to the water tubes and to the furnace that they are exposed to direct radiant heat from said furnace, and that each superheater tube is in close proximity to at least one water tube.

5. In apparatus of the class described, the combination of a furnace, a radiant type superheater comprising parallel alined superheater tubes adjacent to a wall of said furnace, and water tubes parallel to the superheater tubes and arranged in a plane adjacent to the superheater tubes on the furnace side, the tubes being so distributed that not more than two superheater tubes lie opposite the space between any pair of neighboring water tubes.

BENJAMIN BROIDO,
*Deceased,*
By THE SUPERHEATER COMPANY,
*Assignee,*
By F. A. SCHAFF,
*President.*